(12) United States Patent
Ronnekleiv et al.

(10) Patent No.: US 10,247,581 B2
(45) Date of Patent: Apr. 2, 2019

(54) INTERFEROMETRIC OPTICAL FIBRE SENSOR SYSTEM AND METHOD OF INTERROGATION

(71) Applicant: OPTOPLAN AS, Tiller (NO)

(72) Inventors: Erlend Ronnekleiv, Trondheim (NO); Ole Henrik Waagaard, Trondheim (NO)

(73) Assignee: Optoplan AS, Tiller (NO)

( * ) Notice: Subject to any disclaimer, the term of this patent is extended or adjusted under 35 U.S.C. 154(b) by 175 days.

(21) Appl. No.: 15/306,832

(22) PCT Filed: Apr. 28, 2015

(86) PCT No.: PCT/EP2015/059257
§ 371 (c)(1),
(2) Date: Oct. 26, 2016

(87) PCT Pub. No.: WO2015/165924
PCT Pub. Date: Nov. 5, 2015

(65) Prior Publication Data
US 2018/0188077 A1    Jul. 5, 2018

(30) Foreign Application Priority Data

Apr. 28, 2014 (EP) .................................... 14166237

(51) Int. Cl.
*G01B 9/02* (2006.01)
*G01D 5/26* (2006.01)

(52) U.S. Cl.
CPC ............. *G01D 5/266* (2013.01); *G01B 9/02* (2013.01); *G01D 5/268* (2013.01); *G01B 2290/70* (2013.01)

(58) Field of Classification Search
CPC .... G01D 5/266; G01D 5/268; G01D 5/35303; G01D 5/35306; G01D 5/35316;
(Continued)

(56) References Cited

U.S. PATENT DOCUMENTS

2005/0046860 A1* 3/2005 Waagaard .............. G01D 5/345
356/478

2006/0181711 A1    8/2006 Waagaard et al.
(Continued)

FOREIGN PATENT DOCUMENTS

CN    101506637 A    8/2009
EP    2 060 933 A2    5/2009
(Continued)

OTHER PUBLICATIONS

International Search Report and Written Opinion of PCT/EP2015/059257, dated Jul. 5, 2015, pp. 1-11.

*Primary Examiner* — Tarifur R Chowdhury
*Assistant Examiner* — Jonathan Cook
(74) *Attorney, Agent, or Firm* — Tong, Rea, Bentley & Kim, LLC

(57) ABSTRACT

The invention relates to a method of interrogating an interferometric optical fiber sensor system including a laser source configured to generate interrogation light and a sensor array with at least a first reflector and a second reflector. The method includes continuously and repeatedly frequency sweeping the interrogation light from the laser source within a sweep bandwidth (SWB) over a sweep duration ($t_{sw}$) with a substantially constant sweep rate $r=SBW/t_{sw}$ to produce a swept interrogation light signal, launching the swept interrogation light signal into the sensor array, detecting reflected signals being returned from the sensor array by each of the reflectors, respectively, wherein detection includes mixing a return light signal from the sensor array with a local oscillator signal onto an optical receiver to produce an electrical radio frequency signal, demultiplexing the electrical radio frequency signal into a first signal channel and a second signal channel, corresponding to the first and second reflector, respectively, demodulating each of the first and second signal channel into a first phase response from the first reflector and a second phase response from the second reflector, and subtracting the first phase response from the second phase response to obtain a sensor phase signal.

20 Claims, 5 Drawing Sheets a)

b)

c)

(58) Field of Classification Search
CPC ........... G01D 5/35383; G01D 5/35387; G01D 5/35393; G01B 9/02; G01B 9/02002; G01B 9/02003; G01B 9/02004; G01B 2290/70; G01B 11/18; G01B 11/161; G01H 9/004; G01L 1/246; G01J 9/04; G01J 2009/0226; G01J 2009/0253; G01J 2009/0265
USPC ........................................................ 356/478
See application file for complete search history.

(56) References Cited

U.S. PATENT DOCUMENTS

| | | |
|---|---|---|
| 2009/0174931 A1 | 7/2009 | Huber et al. |
| 2010/0085992 A1 | 4/2010 | Rakuljic et al. |
| 2014/0255023 A1* | 9/2014 | Kishida .................. G01H 9/004 398/21 |
| 2014/0341501 A1* | 11/2014 | Taverner ............ G01D 5/35316 385/12 |

FOREIGN PATENT DOCUMENTS

| | | |
|---|---|---|
| GB | 2 406 166 A | 3/2005 |
| GB | 2 423 149 A | 8/2006 |
| JP | H07005068 A | 1/1995 |
| JP | H10082858 A | 3/1998 |
| JP | 2009-198257 A | 9/2009 |
| JP | 2010-054366 A | 3/2010 |
| JP | 2010-190728 A | 9/2010 |
| JP | 2011-214921 A | 10/2011 |
| JP | 2012-154678 A | 8/2012 |
| JP | 2012-247427 A | 12/2012 |
| WO | WO 2005/015149 A1 | 2/2005 |
| WO | WO 2007/045028 A1 | 4/2007 |
| WO | WO 2009/065086 A2 | 5/2009 |

* cited by examiner

Optical field apodization

INTERFEROMETRIC OPTICAL FIBRE SENSOR SYSTEM AND METHOD OF INTERROGATION

CROSS-REFERENCE TO RELATED APPLICATIONS

This application is based on and claims the benefit of European Patent Application No. 14166237.9, filed Apr. 28, 2014, and International Patent Application No. PCT/EP2015/059257, filed Apr. 28, 2015, both of which are hereby incorporated herein by reference in their entirety.

FIELD OF THE INVENTION

The present invention relates to an interferometric optical fibre sensor system and a method of interrogating an interferometric optical fibre sensor system.

BACKGROUND OF THE INVENTION

Optical fibre sensor systems have been deployed in many different applications due to their general distributed nature. Such systems enable that measurements may be made either distributed, or quasi-distributed, i.e. in a potentially large number of points along the fibre. Furthermore, optical fibre sensors in general lend themselves to being multiplexed along a single fibre, thus potentially reducing number of fibres and complexity and bulky lead-in cables, etc.

One class of quasi-distributed optical fibre sensor systems is based on series of reflectors arranged along one or more fibres in an array. Reflectors may, e.g., be fibre Bragg gratings (FBGs), splices, or other types of fibre perturbations resulting in a reflectance larger than an intrinsic backscatter level along the fibre. Reflected signals from the reflectors may for instance be used in interferometric sensor arrangements to deduce the distance, or the variation in distance to the reflectors, or between sets of reflectors.

Interferometric sensor arrays based on FBG reflectors along a sensor fibre has typically been interrogated with wavelength division multiplexing (WDM), having FBGs at different wavelengths, and/or time division multiplexing (TDM), using pulsed interrogation to interrogate an array of equal wavelength FBG based interferometers, as described in U.S. Pat. No. 7,366,055 by the same application, which is hereby incorporated by reference.

Increasing the number of time-multiplexed sensors along the same fibre will typically require a reduced pulse duty cycle, scaling inversely proportional to the number of sensors. This will reduced the dynamic range and the sensor phase resolution due to lower time averaged optical power at the receiver.

One way to obtain distributed sensing with a very large number of interferometric sensor sections along a single fibre is to exploit the Rayleigh back-scattering in the fibre, as e.g. described in U.S. Pat. No. 7,764,363, using pulsed interrogation which separates the sensor sections along the fibre in time.

An alternative interrogation technique is to use the coherent optical frequency domain reflectometry (C-OFDR)-method, which is commonly used for high spatial resolution characterisation of attenuation and backscattering in optical fibres and components. Here, frequency swept laser light is launched into the fibre under test and the return light is coherently detected by mixing the reflected light with a reference signal at a receiver. Thus, light backscattered from different longitudinal positions will be separated in the frequency domain at the receiver.

US 2012/0174677 A1 (Hill) discloses an C-OFDR-based sensor system for distributed interferometric sensing based on Rayleigh scattering along a fibre for measurements of mechanical parameters, in particular mechanical vibrations along the fibre.

Distributed interferometric sensing based on the Rayleigh scattering of the fibre provide limited sensor phase resolution due to the very low optical power levels reflected back to the receiver.

Hence, an improved optical fibre sensor system would be advantageous, and in particular a more efficient and/or improved method of interrogating an optical fibre sensor system would be advantageous.

OBJECT OF THE INVENTION

It is an objective of the present innovation to overcome the presented limitations in the prior art. In particular, it is an objective to provide multiplexing of a large number of interferometric sensors along a fibre, while at the same time obtaining high sensor phase resolution, and large dynamic range.

It is a further object of the present invention to provide an alternative to the prior art.

SUMMARY OF THE INVENTION

Thus, the above-described object and several other objects are intended to be obtained in a first aspect of the invention by providing a method of interrogating an interferometric optical fibre sensor system. The system comprises a laser source for generating interrogation light and an sensor array with at least a first and a second reflector and with a sensor delay being a difference in propagation time for light being reflected from the first and second reflector, respectively. The method comprises continuously and repeatedly frequency sweeping the interrogation light from the laser source within a sweep bandwidth, SBW, over a sweep duration, $t_{sw}$, with a substantially constant sweep rate $r=SBW/t_{sw}$, to produce a swept interrogation light signal. The swept interrogation light signal is launched into the sensor array. The method further comprising detecting reflected signals being returned from the sensor array by each of the reflectors, respectively, wherein detection comprises mixing a return light signal from the array with a local oscillator, LO, signal onto an optical receiver to produce an electrical radio frequency signal. The electrical radio frequency signal is then demultiplexed into a first and second signal channel, corresponding to the first and second reflector, respectively. Each of the first and second signal channel are demodulated into a first phase response from the first reflector and a second phase response from the second reflector. Finally, the method comprises subtracting the first phase response from the second phase response to obtain a sensor phase signal. In this way, a continuous and spatially resolved interrogation of the sensor array may be achieved. Spatial resolution, i.e. separation of responses from multiple spatially distributed sensors, is possible since reflected signals from individual reflectors at any point in time will be separated in frequency. Coherent detection, i.e. the mixing of the return light signal and the LO, has a number of advantages, notably the potential to achieve quantum-noise limited detection. In this case, the detection noise will be dominated by the shot-noise arising from the discrete nature of the individual incoming photons of the mixed signals. The amplitude of the mixed signal is generally proportional to the square root of the product of the intensity of the return light signal electrical field and the LO electrical field intensity. While the return light signal is generally weak, the intensity of the LO may be directly controlled. Thus, by selecting a sufficiently large LO intensity, the intensity of the mixed signal may be significantly larger than the intensity of the return light signal. Consequently, the sensitivity of the receiver system may be increased, compared to a direct detection scheme.

In the context of the present text, "continuous and repeated" sweeping is to be understood as the emitted light frequency being modulated linearly in time from a first limit of the sweep bandwidth to a second limit of the sweep bandwidth, after which a new sweep is initiated immediately. A skilled person will, however, understand that a short switching time may be required to restart the new sweep after terminating the old sweep, wherein a short switching time is to be seen relatively to the sweep duration $t_{sw}$, e.g. <20% of $t_{sw}$, such as <10% of $t_{sw}$, or even <5% of $t_{sw}$. Thus, a system operating a method including such a short switching time is still to be considered as continuously sweeping. In this way, reflected signals from one or more reflectors from a first sweep may still be propagating back towards the receiver while light from a second sweep is being launched into the interferometric sensor array. In some cases, the reflected signal from the first reflector arising from the second sweep may even be detected simultaneously to, but at another frequency from, the reflected signal from the last reflector arising from the first sweep.

Continuous interrogation allows for a duty cycle close to 1, even on long sensor array spans (e.g. 2-10 km or even longer). It furthermore alleviates problems with $2\pi$-ambiguity of phase changes, which may otherwise occur in case of large phase changes during a period without interrogation. This results in an improved dynamic range (i.e. sweep rate and slew rate) of a system operating according to the invention.

The sensor array may be configured in several different topologies, such as a linear topology, a star topology, etc.

The sensors of the sensor array are generally comprised of a transducer, configured to transform a variation in a measurand into a change in an optical path delay of a sensor segment of the sensor array. One such optical change is a length change of the sensor segment. Alternatively, a change in refractive index or birefringence may result in such an optical path delay change.

Measurands may e.g. be pressure variations such as acoustic signals, strain variation, or acceleration.

In an embodiment of the invention, the sensor segment is defined as a segment of an optical fibre in between two consecutive reflectors.

In an embodiment of the invention, the sensor segment is defined as a difference in path between two reflectors in separate fibres.

In an embodiment of the invention, the sensor array comprises a reference sensor defined between two reflectors and being substantially insensitive to the measurand. In this way, a reference signal may be obtained, which will contain some noise components arising from the same source fluctuations, such as phase- and intensity fluctuations, arising from the laser source as the remaining sensors, but which are not sensitive to the measurand. As such, this reference signal may be used to compensate measured signals from the sensors for noise caused by source fluctuations.

In an embodiment of the method according to the invention, the interferometric sensor array comprises one or more additional reflectors following the second reflector so as to comprise a multitude of reflectors. The fibre section between any pair of reflectors may thus form a sensor, thus allowing for a multitude of sensors. In a typical configuration, only fibre sections between two consecutive reflectors are defined as sensors. Using this method, a high number of reflectors and thus interferometric sensors may be interrogated while maintaining a high duty cycle, large dynamic range. Since a continuous wave (CW) system is used, high optical peak powers as required in pulsed systems may be avoided, thus minimizing problems with nonlinear effects in the array.

In an embodiment comprising additional reflectors, the additional reflectors are nominally identical to the first and/or the second reflector.

In an embodiment of the method according to the invention, the first and/or second reflector is a discrete reflector. The use of discrete reflectors enables a higher reflectivity than distributed Rayleigh reflectors, resulting in an improved signal-to-noise (S/N) ratio (cf. e.g. the Rayleigh-based distributed sensor system disclosed in US 2012/0174677 A1, "Hill"), which enables an improved resolution of a measurand due to reduced phase noise in optical delay measurements. In the present context, a discrete reflector is to be understood as a localized feature of the sensor array having a reflectance that is larger than an average backscatter level of the sensor array away from the reflector, such as about 2 to 5 orders of magnitude times the backscatter level from 10 m of fibre. Furthermore, localized is to be understood as having an extent along an optical propagation direction of the sensor array of less than 0.5 times a spatial resolution of the optical sensor system, such as less than 0.2 times the spatial resolution, or even less than 0.1, or even about 0.01 times the spatial resolution. In other words, the discrete reflectors may have a longitudinal extent along the propagation direction, but the extent being substantially unresolved by the sensor system.

In an embodiment of the method according to the invention, the discrete reflector(s) is/are or comprise(s) a fibre Bragg grating, FBG. FBGs allow for a large degree of tailorability with regards to reflectivity, reflectance bandwidth, wavelength of reflective band, etc. Furthermore, multiple FBGs may be inscribed in a continuous length of fibre, thus preventing or limiting loss of mechanical strength of the fibre introduced by a reflector.

In an alternative embodiment, the first and/or second reflector is based on Rayleigh backscatter from a length of fibre.

In an embodiment of the method according to the invention, the sweep bandwidth SBW is selected to be less than a bandwidth of the optical receiver. This makes it possible to achieve continuous interrogation of all sensor channels with only one LO frequency (except for possible duplication of LO frequencies during an apodization overlap period, as discussed below). It also makes it possible to use one single sweep signal for both the sensor interrogation signal and the LO signal.

In an embodiment of the method according to the invention, the optical receiver comprises a balanced detector.

In an embodiment, the receiver is an IQ-receiver, comprising multiple detectors arranged to detect interference with a LO with different phase offsets, the output of these detectors are combined linearly (projected) to extract orthogonal I and Q components. In this way, positive and negative frequency components may be discriminated and thus allow for continuous interrogation even in cases where the LO signal is swept across the same frequency range as the reflected interrogating signal.

It is noted that if using a complex IQ-receiver, comprising at least two optical detectors, it may be possible to have a useable bandwidth that equals two times the bandwidth of each physical detector, since the useable bandwidth in this case includes both positive and negative frequencies. Thus, the sweep bandwidth may be selected accordingly.

In an embodiment of the method according to the invention, the local oscillator light signal is generated by the laser source. For instance, the LO light signal may be split off from or generated from the interrogation light signal. Or the LO light and the interrogating light may originate from the same laser but be modulated by different electro-optical modulators, or one of the signals may not be modulated outside the laser at all.

In an alternative embodiment, the local oscillator light signal is generated separately from the interrogation light.

In one embodiment, wherein the local oscillator light is not swept as the interrogation light, and the beat signal between the return light signal and the LO is thus not constant in time, demodulating the radio frequency signal comprises sampling the electrical radio frequency signal with an analogue-to-digital converter and mixing the resulting digital signal with a complex synthetic sweep signal, the synthetic sweep signal being generated to have the same sweep rate as the interrogation signal, but with the opposite sign. Thus, the frequencies of the mixed signals will be constant in time, apart from jumps between two frequency channels when either of the swept interrogation signal or the synthetic sweep signal are reset, i.e. two jumps per sweep period.

In an embodiment of the method according to the invention, the local oscillator light signal is a part of the swept interrogation light signal. Since the LO light is also swept in this embodiment, a beat frequency between a reflected signal and the LO light will be constant in time, except when a new LO sweep is started, and when the reflected signal progresses from one sweep to the next.

In an embodiment of the method according to the invention, the sweep duration, $t_{sw}$, is selected to be larger than $Nt_s$, where $Nt_s$ is a return time from the first to a last sensor, N being the number of reflectors in the array, and $t_s$ being an average round-trip time separation between two neighbouring reflectors. In this way, overlap in the optical frequency-domain at the receiver between reflected signals from separate sweeps and separate reflectors is avoided.

In an embodiment of the method, the sweep duration, $t_{sw}$, is selected to be larger than $3Nt_s$. In this way, overlap in the RF frequency-domain between the desired signal frequencies caused by interference between the LO and the direct, primary reflections from a reflector, and unwanted beat frequencies caused by interference between different primary reflections (i.e. without the LO) may be avoided.

In an embodiment, the reflectors of the sensor array are located along the array with a spacing corresponding to an integer number of return time delay periods $t_s$, and wherein the return delay between the first reflector and the last reflector is $Nt_s$. Thus, a reflector is not necessarily found for every integer value of the delay $t_s$, but any reflector present is located (to within production tolerances) at such an integer point. In this way, cross talk arising from multiple reflections in the array may be corrected for, e.g. using layer-peeling as described in U.S. Pat. No. 7,206,075 B2 by the same applicant, which is hereby incorporated by reference at least for the purpose of describing layer-peeling.

In an embodiment, the reflectors of the sensor array are located along the array with the spacing corresponding to an integer number of return time delay periods $t_s \pm 50$ cm, such as $\pm 10$ cm, or even $\pm 1$ cm.

In an embodiment of the method according to the invention, the sweep bandwidth, SBW, selected to be less than about 200 MHz, such as less than about 100 MHz, or even less than about 20 MHz.

In an embodiment of the method according to the invention, the sweep rate r is selected to be in the range of about 0.1-100 GHz/ms, such as about 0.5-50 GHz/ms, or even about 1.0-10 GHz/ms.

In an embodiment of the method according to the invention, the step of demultiplexing the electric radio frequency signal further comprises filtering the electric radio frequency signal to separate a positive frequency band and a negative frequency band. In this embodiment, the method further comprises frequency shifting the positive frequency band and/or the negative frequency band by mixing with a mixer signal having a complex constant frequency calculated to make the positive frequency band and the negative frequency band overlap in frequency. Finally, the method in this embodiment comprises summing the frequency shifted frequency bands into a combined signal for demodulation. In this way, the negative and positive frequency bands may be combined to allow for continuous detection of the sensor phase responses.

In an embodiment of the method according to the invention, the filtering uses a filter having a time dependent response adapted for suppressing noise in time intervals without signals in the positive frequency band or the negative frequency band, respectively. Thus, noise contributions from one band may be filtered out when no signal is present in that band, and the other band is being monitored.

In an embodiment of the method according to the invention, the filtering uses a filter having a time and frequency response configured to apply a time and frequency dependent phase shift to the positive frequency band and/or the negative frequency band before they are combined by summation. In this way, a matching of phases between the negative frequency bands may be achieved in the combined band.

In an embodiment of the method according to the invention, the optical field amplitude of the swept interrogation light signal is apodized at an end of a completing sweep related to one frequency band, and at a beginning of a subsequent sweep related to the other frequency band, for an apodization duration time of $T_{apod}$ from a beginning to an end of the apodization, so as to reduce cross-talk between the frequency bands when combined. This is achieved by suppressing the otherwise very broadbanded beat signals which would be generated by a near-instantaneous frequency jump from one sweep to the next.

In an embodiment of the method according to the invention, the apodization duration time, $T_{apod}$ is in the range of 0.8·1/SBW to 10·1/SBW, such as 0.9·1/SBW to 5·1/SBW, or larger than 1/SBW.

In an embodiment of the method according to the invention, the end apodization of the completing sweep and the start apodization of the subsequent sweep overlap in time. Thus, interrogation light signals from both sweeps will be launched into the sensor system simultaneously during the transition related to the overlap.

In an embodiment of the method according to the invention, the apodization is configured such that a sum of the optical field amplitudes of the completing sweep and the subsequent sweep is substantially constant throughout the apodization duration time.

In one embodiment, the swept interrogation light signal for the ending sweep is provided by a first laser source while the swept interrogation light signal for the subsequent sweep is provided by a second laser source. In this way, a simple apodization of the two sweeps may be achieved, e.g. simply by separately intensity modulating the outputs from the first and second laser sources.

In one embodiment, the intensity modulation of both signals is achieved by a single AOM, supplied with the sum of two control signals forming the two simultaneous sweep signals.

In another embodiment, the intensity modulation of both signals is achieved by one single-sideband lithium-niobate modulator, supplied with the sum of two control signals forming the two simultaneous sweep signals. Alternatively, each light signal may be intensity modulated with separate modulators.

According to a second aspect of the invention, the invention is furthermore advantageous for obtaining an interferometric optical fibre sensor system for substantially continuous data acquisition. The system comprises a laser source for emitting interrogation light at a frequency v. The system further comprising at least a first optical modulator being operable for continuously and repeatedly frequency sweeping the interrogation light to have a frequency $v_1=v+f_1$, within a sweep bandwidth, SBW, over a sweep duration, $t_{sw}$, with a substantially constant sweep rate $r=SBW/t_{sw}$. The system additionally comprising a sensor array having an input end, a distal end, and comprising at least a first and a second reflector, wherein the sensor array is arranged to receive light output from the at least first optical modulator via the input end, the sensor array is further arranged to out-couple a return signal at the input end. A coherent receiver is arranged to mix a local oscillator (LO) signal, with the return signal from the sensor array, to produce an electrical radio frequency signal. Finally, the system comprises a processor configured for demultiplexing the electrical radio frequency signal into a first and second signal channel, corresponding to the first and second reflector, respectively, for continuously demodulating each of the first and second signal channel into a first phase response from the first reflector and a second phase response from the second reflector, and for subtracting the first phase response from the second phase response to obtain a sensor phase signal. In this way, the interferometric optical fibre sensor system is configured to act according to the abovementioned method of interrogating a sensor system. Thus, the advantages described above for the method also applies to the system.

The processor may be implemented in different ways, such as using analog processing, or in software. A combination may also be used, such that one or more steps are made using analog processing and remaining steps are performed in software.

In an embodiment of the system according to the invention the system further comprises a second optical modulator for linearly frequency sweeping the light emitted from the laser to have a frequency $v_2=v+f_2$, wherein the second optical modulator is connected in parallel with the first optical modulator. The system further comprises an optical spatial switch adapted for selectively launching light from the first optical modulator or from the second optical modulator into the sensor fibre. Additionally, the system comprises a reference optical coupler for coupling output light from the first optical modulator together with light from the second optical modulator to result in the modulated reference signal to be coupled to the coherent receiver.

In an embodiment of the system according to the invention, the laser source is a continuous wave (CW) laser.

In an embodiment of the system according to the invention, the laser source is a highly-coherent single-frequency laser. In this way, a particularly low frequency-noise laser signal may be achieved, which is advantageous to increase measurement range and to improve measurement resolution.

In an embodiment, the laser source comprises a fibre laser. In a preferred embodiment, the laser source comprises a fibre distributed feedback (DFB) laser.

In an embodiment of the system according to the invention, the laser is a WDM source, or multiple lasers arranged to emit at different WDM channels. In this context, a WDM source is to be understood as a source simultaneously emitting multiple laser signals at different wavelengths, corresponding to different WDM channels.

In an embodiment of the system according to the invention, the first and/or the second reflector is a discrete reflector.

In an embodiment of the system according to the invention, one or more of the discrete reflectors is or comprises a fibre Bragg grating (FBG).

In an embodiment of the system according to the invention, the sensor array comprises a first wavelength division multiplexing (WDM) reflector group comprising one or more first reflectors configured for reflecting light within a first wavelength range and being substantially non-reflecting for light within a second wavelength range, the sensor array further comprising a second WDM reflector group comprising one or more second reflectors configured for reflecting light within the second wavelength band and being substantially non-reflecting for light within the first wavelength range. In this way, an increased measurement range and/or an increased number of sensors may be interrogated. It is noted that more than two WDM reflector groups may be comprised along the sensor array, and that each number of WDM reflector groups may comprise multiple reflectors. It is further noted that the number of reflectors in each WDM reflector group is not required to be the same across the different groups.

In an embodiment of the system according to the invention, the modulator is an acousto-optic modulator (AOM). In another embodiment of the sensor system, the laser source is capable of being directly modulated to generate the swept interrogation light signal.

In one embodiment, the laser source is an assembly of multiple laser sources arranged to emit light at different wavelengths.

In an embodiment of the system according to the invention, the LO signal is modulated by the first optical modulator.

In an embodiment of the system according to the invention, the LO signal is modulated by both the first optical modulator and the second optical modulator.

In an embodiment of the system according to the invention, the optical fibre sensor system is a seismic sensor system.

In an embodiment of the system according to the invention, the optical fibre sensor system is an ocean bottom seismic sensor system.

In an embodiment of the system according to the invention, the optical fibre sensor system is a quasi-distributed acoustic sensor (DAS) system.

In an embodiment of the system according to the invention, the modulator comprises a phase modulator, for instance an electro-optic Lithium Niobate phase modulator that switches the optical phase at discrete time intervals following a quadratic function of discrete time modulus $2\pi$ or an integer times $2\pi$. This will result in a continuously repeated linear frequency sweep versus discrete time. The phase switching interval may typically equal $\tau_s$. An intensity modulator may be added to turn off the light intensity for a short time interval (typically <0.5 $\tau_s$) near each switching instance, to suppress non-ideal effects of the phase transition.

According to the third aspect, the invention is furthermore advantageous for obtaining another interferometric optical fibre sensor system for substantially continuous data acquisition. Compared to the system according to the second aspect, this system comprises a directly modulated laser, and therefore alleviates the need for the first optical modulator for generating the swept interrogation light signal. In some embodiments of this system, one or more modulators may be comprised, e.g. to apodize the swept interrogation light signal from the laser, and/or in general to create different signals for sensor interrogation and for the local oscillator.

The first, second, and third aspects of the present invention may be combined. These and other aspects of the invention will be apparent from and elucidated with reference to the embodiments described hereinafter.

BRIEF DESCRIPTION OF THE FIGURES

The method of interrogating and the interferometric optical fibre sensor system according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
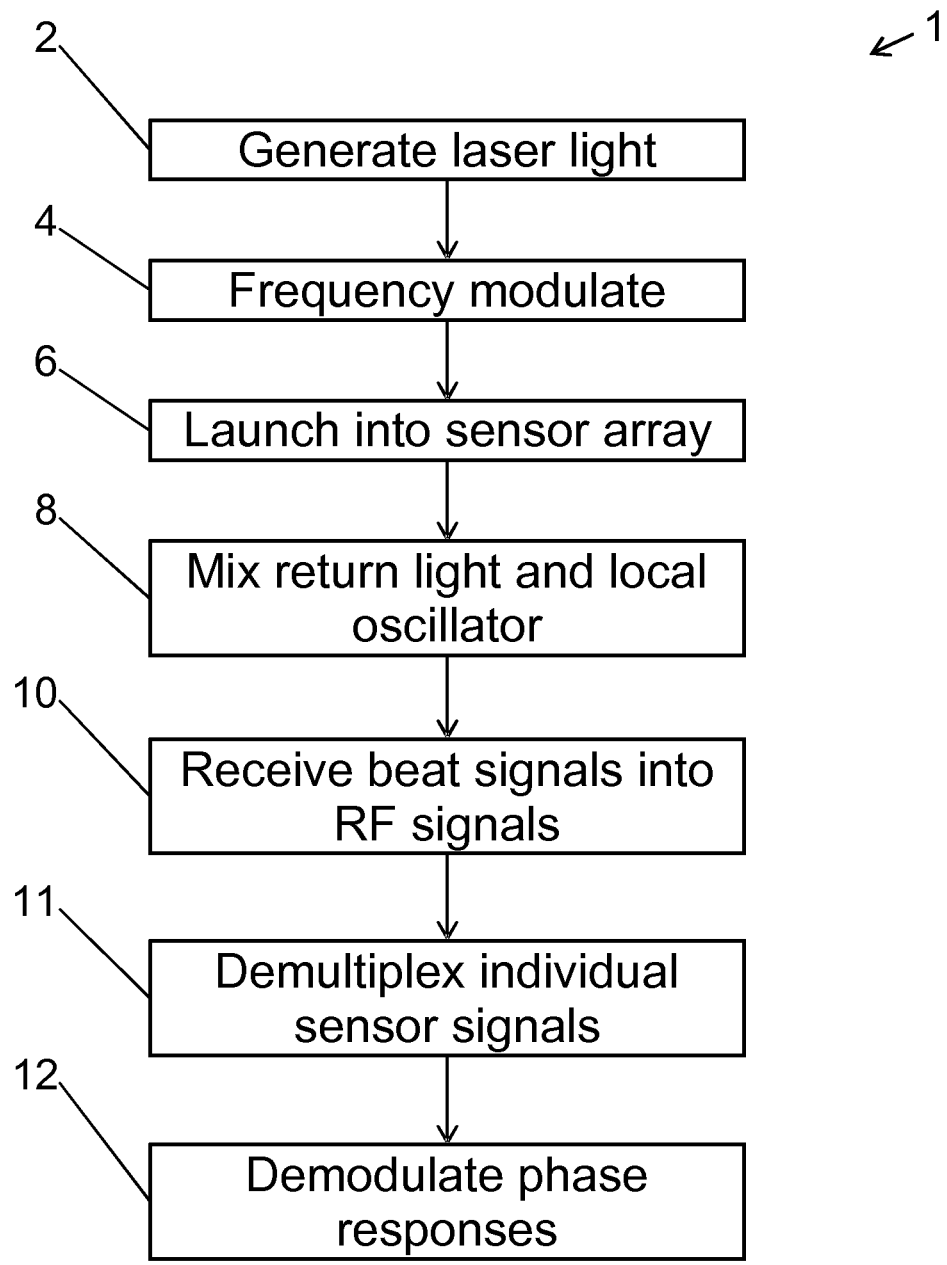
FIG. 1 is a flow-chart of a method according to the invention.

FIG. 1 illustrates the method 1 of interrogating an interferometric optical fibre sensor system according to the invention. First, interrogation light 2 is generated with a source laser. The laser may be of the continuous wave (CW) type. The interrogation light is frequency modulated 4 in a continuous and repeated manner, as defined above, to produce a swept interrogation light signal. The step of frequency modulation 4 may be performed in different ways, such as direct modulation of the laser source or modulation external to the laser source. External modulation may preferably be performed with an acousto-optic modulator (AOM). The swept interrogation light signal is then launched 6 into the optical fibre sensor array comprising at least two reflectors. Thus, the light launched will have a frequency which is dependent on the launch time, due to the sweep. Therefore, light being reflected from the reflectors at different positions along the sensor array will have different frequencies as the reflectors will have different round-trip delays. To distinguish between the return light from the individual reflectors, the total return light signal is mixed 8 with a local oscillator (LO) signal onto a detector, comprised by a receiver. In this way, a radio frequency signal 10 is produced, with frequency components at the beat frequencies between the return light signal and the local oscillator. It is noted that depending on the LO signal, the beat frequency for a single reflector may either vary with time (e.g. in case the LO has a frequency which is constant over a sweep), or a constant beat frequency, in case the LO is swept with the same sweep rate as the interrogation light signal. Thus, further processing of the detected signal may be performed in the electrical domain as opposed to the optical domain. This is for instance done in the two last steps illustrated here, i.e. to demultiplex the individual sensor signals 11, and to demodulate each sensor signal to obtain the sensor responses from the RF signal 12.

Figure 2:
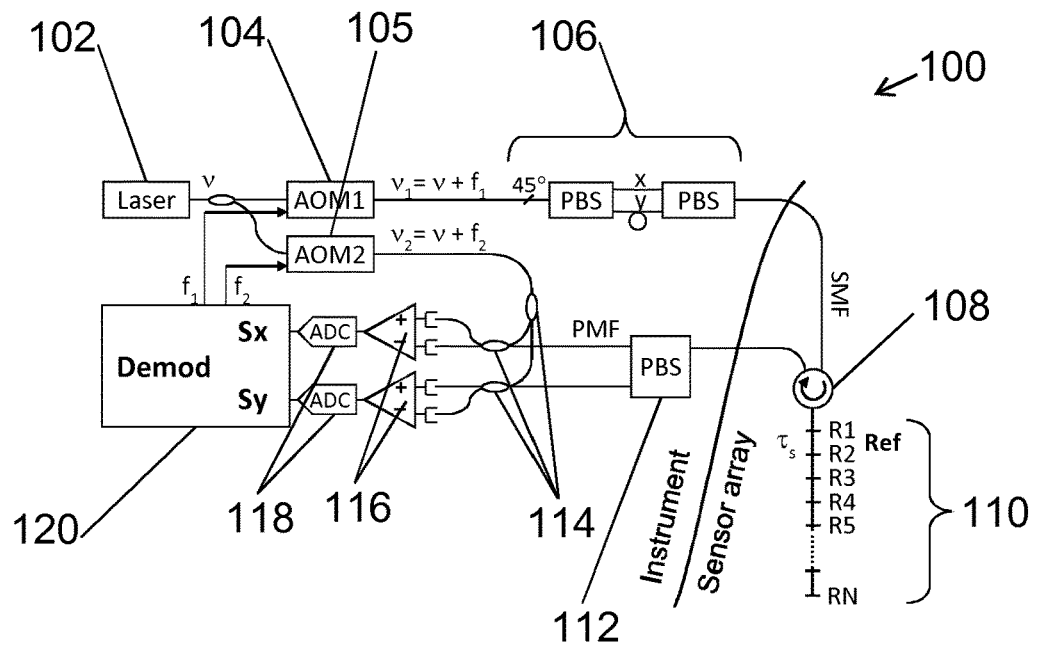
FIG. 2 illustrates configuration of an embodiment of a sensor system according to the invention, and details of an embodiment of the method according to the invention of interrogating the sensor system.
Figure 2:
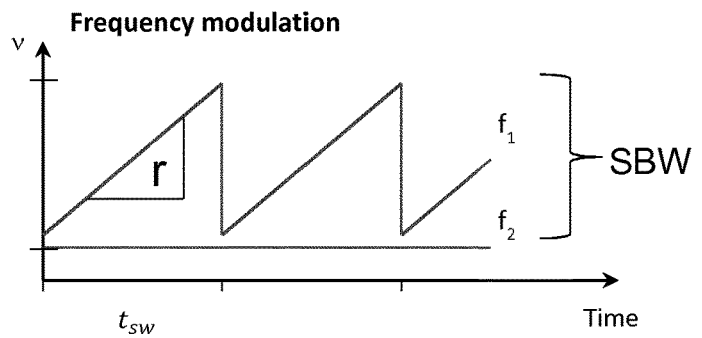
Figure 2:
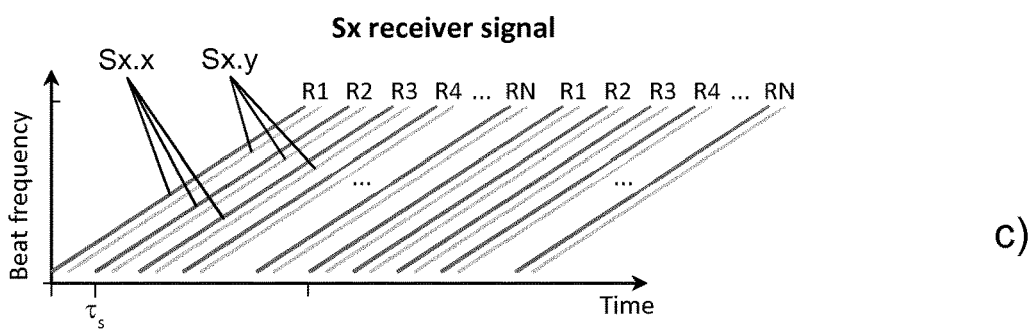

FIG. 2a shows an embodiment of the sensor system 100 according to the invention, and being adapted for performing an embodiment of the method of the invention. Laser light is generated in the laser 102 with a frequency v, after which a splitter divides the light into a local oscillator signal going to AOM2 105, while the other part of the split is the interrogation light, which is frequency swept with AOM1 104. A split ratio of the splitter is preferably selected or adjusted to yield a LO signal with an optical power in the range 0.1 mW-10 mW, to result in a shot-noise limited detection. Thus, the split ratio is not restricted to a 50% split, but may be chosen e.g. based on the optical power levels involved in the application. AOM1 104 is controlled by a digital controller (not shown) generating a signal that is digital-to-analog (DA) converted and used to drive a RF signal generator. In this way, AOM1 is operated to apply a linear frequency shift to the interrogating light. To probe both orthogonal polarization states of the sensor array 110, a polarization interleaver 106 is deployed. Here, the light is coupled equally to both polarizations with a polarizing beam splitter (PBS), the Y polarization is delayed to separate interrogation frequencies in the two polarizations, and the X and Y polarization are combined again before launching into the sensor array 110. In the embodiment shown here, the system comprises standard single-mode fibre (SMF) in the sensor array, i.e. from the second PBS of the polarization interleaver 106 to the PBS 112 on the receiver side. In contrast, the fibres used between the laser and the polarization interleaver 106, throughout the LO path, and from the PBS 112 to the receiver is comprised by polarization maintaining fibre (PMF). The length of optical fibre cable between the instrument and the reflectors of sensor array 110 is commonly known as a "lead-in cable". The array has a number of reflectors being substantially equally spaced along the length, with a delay $\tau_s$ between any two neighbouring reflectors. Here, the first two reflectors, R1 and R2, are indicated in the figure to form a reference sensor, REF, having a known and substantially constant length or separation between the reflectors. In this way, the detected signal from the reference sensor may be used to correct detected signals from the other sensors with respect to common phase fluctuations arising from frequency fluctuations in the swept frequency signal from the laser source and modulator, or Doppler-induced frequency noise due to environmentally induced phase fluctuations in the lead-in fibre path or LO fibre path. The back-reflected signal, or return light, is directed via a circulator 108 towards a receiver 116, comprising one or more detectors. Using a combination of a polarizing beam splitter (PBS) 112 and two 2×2 couplers 114, the return light is mixed with the LO signal before reaching the receiver 116. The two polarization states of the return light are projected into two orthogonal receiver polarization channels, Sx and Sy, by the polarizing beam splitter 112. The difference in delay imposed by the polarization interleaver 106 ensures that the responses from input polarizations x and y will be separated in RF frequency on the receiver channels after the mixing with the LO signal. At the Sx receiver the responses from input x and input y are named Sx.x and Sx.y, respectively, while at the Sy receiver they are named Sy.x and Sy.y. The set of the complex amplitudes of these four components represents the complex Jones matrix of the transmission path from the polarization interleaver 106 to the PBS 112, and thus allow for a complete polarization resolved characterization of the polarization state of the sensor array. Therefore, by analysing the Jones matrices given by the complex amplitudes of the various detected frequencies, both changes in sensor phase and sensor birefringence may be detected. Furthermore, since the complete Jones matrix is known for each time step, cross-talk arising from multiple reflections within the sensor array may be removed e.g. by the layer peeling-method, as described by the same applicant in U.S. Pat. No. 7,206,075 B2, as also mentioned above. To suppress optical intensity noise and unwanted direct interference between the reflected signals, the system is here illustrated to use a balanced receiver for each polarization, where signals from two detectors is subtracted. Finally, the radio frequency electrical signals from the receivers 116 are converted to digital signals in a set of analogue-to-digital converters (ADC), demultiplexed 120 to separate the signals from each reflector of the array 110 and demodulated into a phase. FIG. 2c illustrates the detected beat signals for each reflector. By mixing the electric signal, as illustrated in FIG. 2c with a synthesised LO, having the same r as the swept interrogating signal, but with the opposite sign, then the time dependence of the beat frequencies may be removed and the complex amplitudes may be extracted.

The reflectors of the sensor array may generally be located at arbitrary positions along the array. However, data processing, such as layer peeling as mentioned above is simplified if the reflectors all fall at positions being an integer number of a chosen period.

As an example, assuming that the period is chosen to be 10 m. In this case, it is not required to have a reflector at each position, e.g. for every 10 m, but reflectors present in the array should be located at an integer multiple of periods (e.g. 10 m, 20 m, . . . 100 m, 110 m, . . . , rather than 15 m, 25 m, . . . ). The skilled person will understand that other values of the period may be chosen, depending on the system specification.

FIG. 2b illustrates the swept interrogation signal $f_1$ and the LO signal $f_2$. The interrogation signal is swept with a sweep rate $r=SBW/t_{sw}$, where SBW is a sweep bandwidth and $t_{sw}$ is a sweep duration. In general, it is desirable to have a high tuning rate $r=dv/dt$ (time derivative of the interrogating optical frequency v). A sensor channel frequency separation or bandwidth may be defined $B=rt_s$, where $t_s$ is the sensor delay of a single sensor. The inventors have found that a large bandwidth B (up to eg. 500 kHz) allows i) large dynamic range, ii) large demodulation bandwidth, and iii) reduced sensitivity to laser phase noise near the channel separation frequency. B=500 kHz and $t_s$=100 ns corresponds to r=50 GHz/ms.

A delay resolution is limited by $t_{res}>2/SBW$ (where the factor 2 is due to the polarization interleaver). With 100 ns sensor delays (10 m sensor fibres) a SBW of only 20 MHz is required. This is much smaller than required in typical OFDR systems focused to obtain millimeter resolution.

The inventors have found that the use of a fibre laser in combination with an AOM fast swept frequency shifter allows the required high r, necessary SBW and ultra-low frequency noise. It will hence be possible to obtain both large dynamic range and low noise (high S/N-ratio) with typical sensor lengths (~10 m). It is found to be possible to obtain a similar r with direct strain tuning of a fibre laser (with increased SBW and $t_{rep}$, where $t_{rep}$ is a sweep repetition time, i.e. the time from start of one sweep to the start of the next). Alternatively, other types of frequency modulators may be used, such as a single-sideband-suppressed-carrier modulator. One example of a suitable single-sideband-suppressed-carrier modulator comprises a Lithium Niobate (LiNb)-modulator.

To avoid overlap in the optical time-frequency domain between reflected (primary) signals from different sensors the sweep repetition time must be larger than the return time from the first to the last sensor $N*t_s$ (assuming a constant spacing between reflectors of $t_s$ or multiples thereof. To avoid overlap between primary reflection signals and 3. (or 5.) order reflections from the previous sweep the sweep repetition time must be larger than $2*N*t_s$ (or, respectively, $3*N*t_s$). By keeping the sweep repetition time $>3*N*t_s$ it is also possible to avoid overlap between the primary sensor frequencies on the detector and frequencies originating from direct interference between the primary optical reflections (interference that does not involve the local oscillator). This is illustrated in further detail in FIG. 4.

In an alternative embodiment (not shown), both AOM1 104 and AOM2 105 are used to sweep the interrogation light signal, and both swept signals are used as the LO signal. A sweep is initiated on AOM1 104 and launched into the fibre array, until the sweep is restarted with modulated light from AOM2 105, simply by switching a switch from a first to a second input. However, after switching, return light from the first sweep will still return for some time. Therefore, the sweep from AOM1 is maintained for use as LO until all the return light from that sweep has returned. In this way, a continuous measurement may be achieve, even for long arrays with corresponding long sensor delays for the most distant reflectors. In cases where the sensor fiber is longer than the reflector array interrogated with a single receiver (i.e. exploiting WDM multiplexing of FBGs covering different wavelength bands on the same fiber) an increased sweep repetition time will contribute to eliminate interference with Rayleigh scattering and FBG sideband reflections from the part of the sensor fiber that is interrogated with another center wavelength. It is noted that in this case, as the LO signal is swept with the same sweep rate as the interrogation light signal, the receiver signals will be at fixed frequencies.

Figure 3:
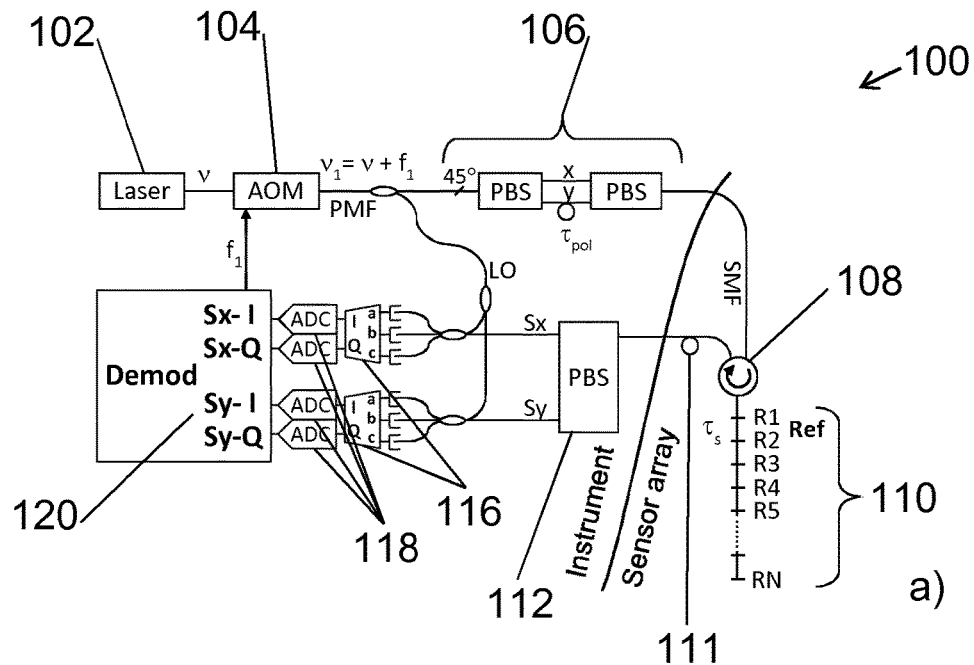
FIG. 3 illustrates configuration of an embodiment of a sensor system according to the invention, and details of an embodiment of the method according to the invention of interrogating the sensor system.
Figure 3:
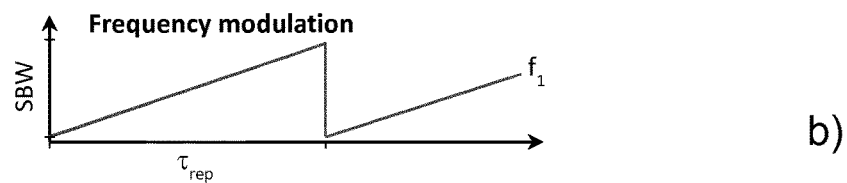
Figure 3:
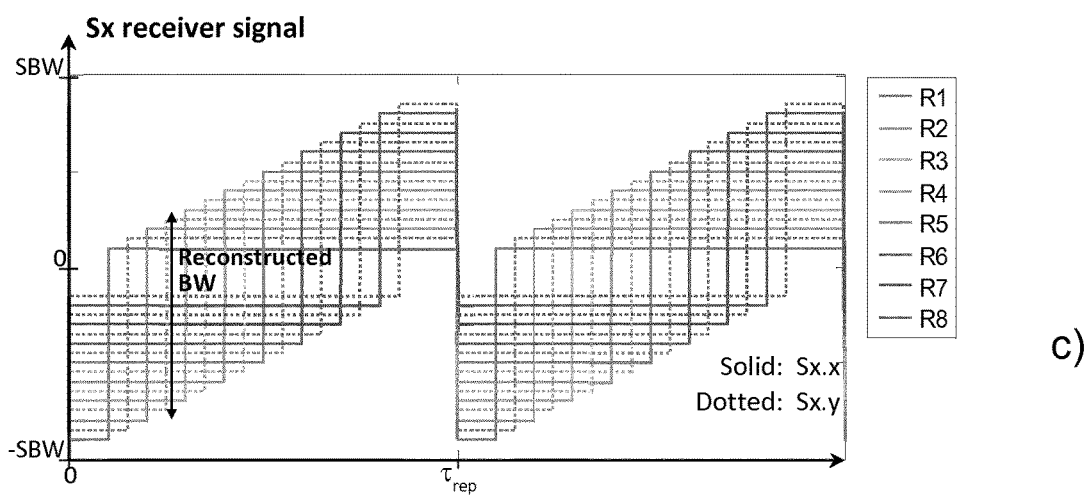

FIG. 3 illustrates another embodiment of the sensor system. The embodiment relates to the embodiments discussed above in relation to FIG. 2. Therefore, only the differences in relation to those embodiments will be discussed here. It is seen that previous AOM2 has been omitted. By using two 2×3 couplers to mix the LO signal with the return light, three complex components with 120 degree phase difference may be detected. Based on these three components, balanced I and Q channels are generated by linear addition and subtraction. An advantage of this implementation is that only one AOM is needed. The required number of ADCs is doubled, but the required bandwidth for each ADC is reduced by a factor of two. Furthermore, constant frequency responses are obtained from the reflectors, eliminating time-domain crosstalk from the receiver. Also illustrated in this embodiment is that a fibre delay 111 (typically in the form of a fibre coil) is introduced in the optical path between the circulator 108 and the PBS 112. In this way, the reflected signals from the array are delayed, compared to the LO signal, which again results in an increased frequency difference and thus beat frequency between the two signals. The fibre delay 111 may also be introduced in the LO arm, or between the interleaver 106 and the circulator 108. Preferably, the round-trip delay to the first reflector in the array is selected to be approximately $Nt_s$ longer than the propagation time of the LO arm, plus an optional integer multiple of sweep repetition time periods, while the sweep repetition time is kept $>3Nt_s$. This corresponds to the case illustrated in FIG. 4, and further described below. In this way, the beat frequencies are separated from unwanted interferences. It is noted that a fibre delay 111 may also be included in the embodiment shown in FIG. 2 for the same reasons.

Figure 4:
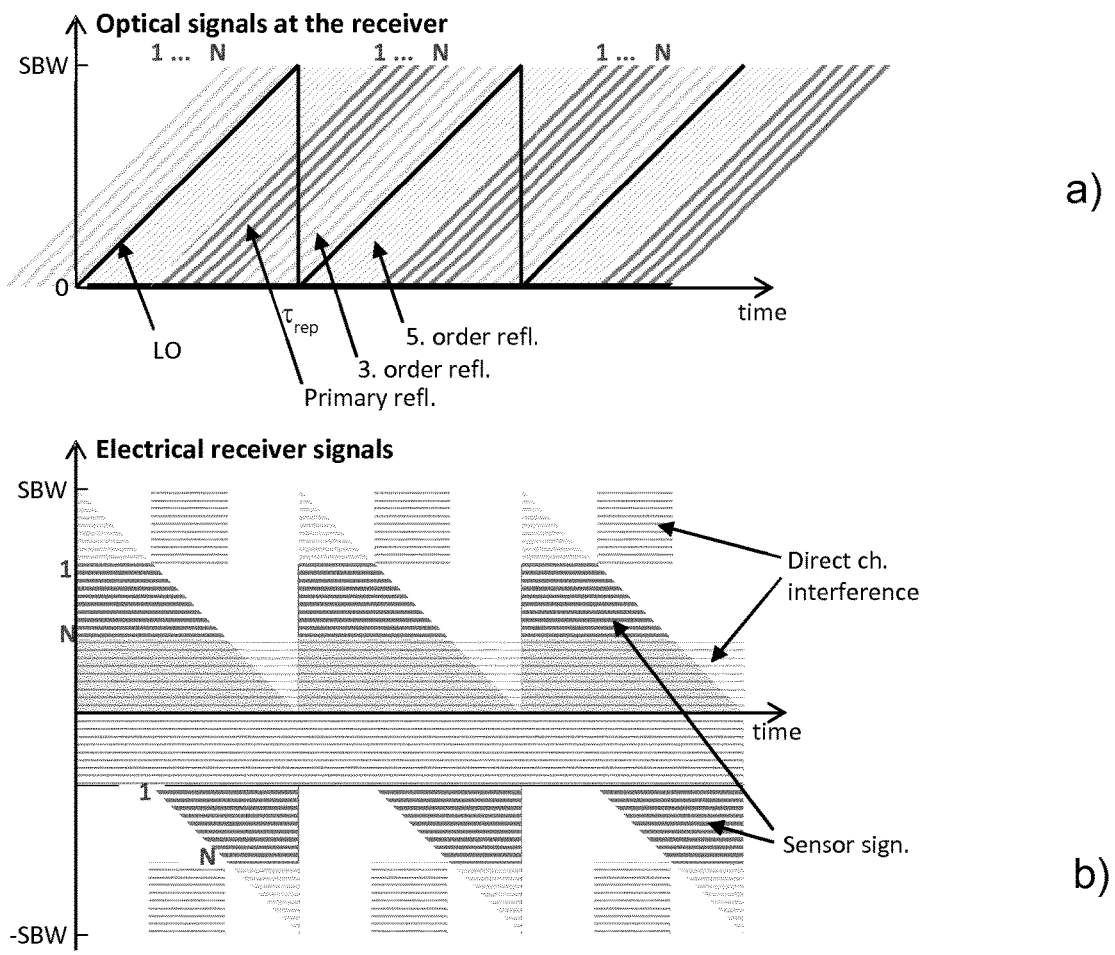
FIG. 4 illustrates details of an embodiment of the method of interrogation.

FIG. 4 illustrates the detected interference-types resulting from the sensor array. In FIG. 4a, the LO signal is indicated. Further to the right, the primary (wanted) reflections are seen, and labelled 1 . . . N to indicate from which reflector they originate. Next group of signals seen are the lowest order multiple reflections, i.e. the third order, which will have a round-trip delay of $<2Nt_s$. Finally, the next group of multiple reflections, i.e. the fifth order, are seen with a delay of $\leq 3Nt_s$. FIG. 4b shows the beat frequencies observed, after mixing with a swept LO signal. It is seen that different types of beat signals arise from unwanted interference, i.e. direct interference between signals from reflector 1 and N (without LO), or interference between either $3^{rd}$ or $5^{th}$ order reflections and LO. By introducing a delay of $Nt_s$ between LO and the reflection from reflector 1, the desired primary beat frequencies will occur in the band between SBW/3 and 2SBW/3, and −SBW/3 and −2SBW/3. The unwanted beat frequency components will fall outside these ranges, as indicated in FIG. 4b.

Figure 5:
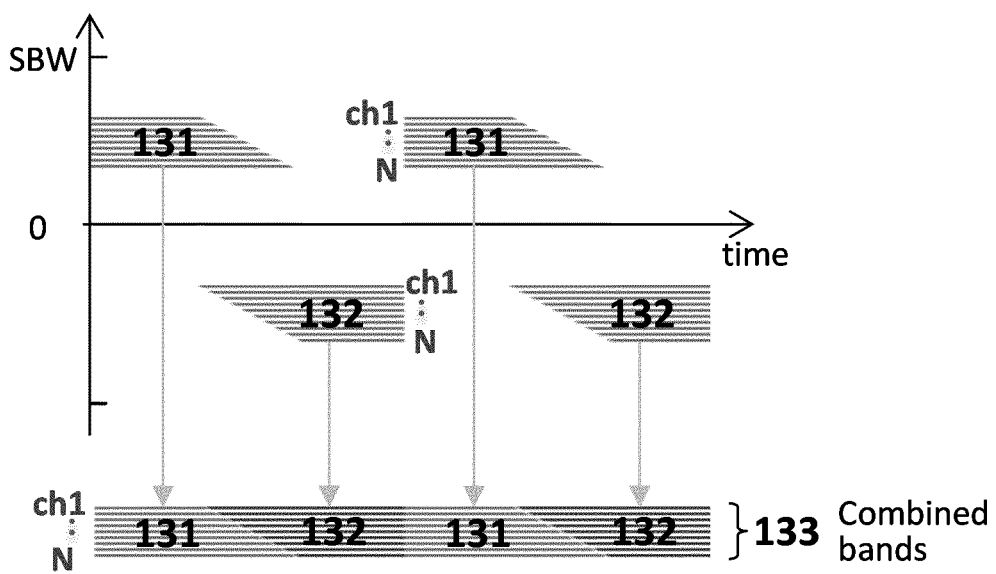
FIG. 5 illustrates details of an embodiment of the method of interrogation.

In FIG. 4b the signal from each sensor channel alternates between a positive and a negative frequency band. FIG. 5 illustrates how the signals in the positive band 131 and the negative band 132 may be combined into a single band with continuous sensor channel frequency signals. This may be done by separating the positive frequency band and the negative frequency band in the frequency domain by filtering, then shifting at least one of the bands in frequency by mixing with a complex mixer signal having a constant frequency to make the bands overlap in frequency, before finally summing the two frequency shifted bands. The filters used may have time dependent responses to suppress noise in time intervals where there is no signals in the respective bands. Filtering may be performed electrically on the electric radio frequency signal, or may be performed digitally, after AD-conversion.

To ensure proper phase match at the transition between the combined bands one must carefully adjust a phase of the complex mixer signal of the last paragraph, causing the frequency shifts of the bands, as well as the bias frequency of the combined signal. The phase matching will be easier if the sweep repetition rate is a multiple of 1/SBW, while all reflector delays are separated by multiples of a nominal sensor delay $\tau_s$, which is also a multiple of 1/SBW. However, if these conditions are not fulfilled, proper phase match may still be achieved by applying a time and frequency dependent phase shift to each of the frequency bands before they are combined.

If the transition of the sweep signal interrogating the sensor array or the LO from the maximum to the minimum frequency is almost instantaneous, the start and the stop of each sensor channel frequency signal within one of the bands 131 and 132 in the upper part of FIG. 5 will be very broadbanded. Frequency components generated at the on-off or off-on transitions in one band, e.g. the positive frequency band, may then overlap with the opposite band, e.g. the negative frequency band, resulting in unwanted crosstalk, which cannot be filtered off before the bands are combined. To avoid such crosstalk, the sweep signal generated by the AOM 104 may be apodized at the start and the end of the sweep. An apodization duration time $T_{apod}>1/SBW$, from a beginning of the apodization to an end of the apodization, will typically be needed to avoid crosstalk between the bands. If the top of the negative band 132 and the top of the positive band 131 are close together, i.e. if the sweep repetition time is significantly shorter than $3*N*t_s$, it may be desirable to make $T_{apod}$ even larger, such as several times 1/SBW.

The apodization may be done in such a way that the amplitude of a completing sweep is brought to zero at the end of the apodization before the following sweep starts to increase above zero at the beginning of that apodization. However, this will result in narrow dips versus time in the individual channel amplitudes of the combined bands 133 which will broaden the channel spectra, and which may contribute to undesirable channel crosstalk.

Figure 6:
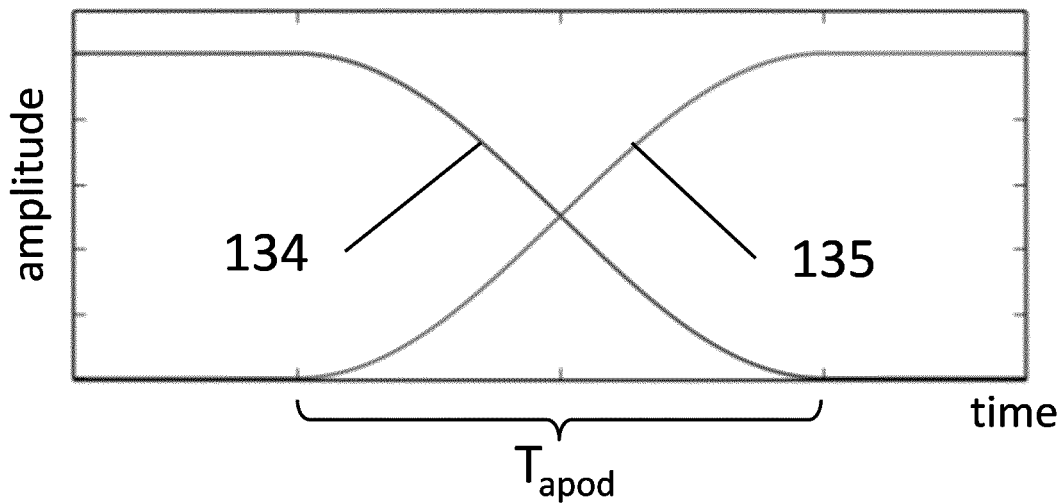
FIG. 6 illustrates apodization of the optical fields related to interrogation light signals.

To avoid this problem the apodization of subsequent sweeps from the AOM may be designed to overlap, as illustrated in FIG. 6. The optical field amplitude (absolute value) 134 of the optical field of an ending sweep is here brought from full amplitude to zero during the apodization duration time $T_{apod}$, while the amplitude 135 of the subsequent sweep is brought from zero to full amplitude. The apodizations may preferably (as illustrated here) be designed such that a sum of the two amplitudes is essentially constant versus time. The frequency sweep rate should preferably be kept constant at r during the apodization period for both sweeps. As a result, there will be no dips versus time in the individual channel frequency signal amplitudes due to sweep transitions, and channel crosstalk will thus be avoided. Continuous phase demodulation without crosstalk penalty is thus made possible through the apodization technique described above, using overlapping sweeps.

In one embodiment, the swept interrogation light signal for the ending sweep is provided by a first laser source while the swept interrogation light signal for the subsequent sweep is provided by a second laser source. In this way, a simple apodization of the two sweeps may be achieved, e.g. simply by separately intensity modulating the outputs from the first and second laser sources. In one embodiment, the intensity modulation of both signals is achieved by a single AOM, supplied with the sum of two control signals forming the two simultaneous sweep signals.

In another embodiment, the intensity modulation of both signals is achieved by one single-sideband lithium-niobate modulator, supplied with the sum of two control signals forming the two simultaneous sweep signals. Alternatively, each light signal may be intensity modulated with separate modulators.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of interrogating an interferometric optical fibre sensor system, the interferometric optical fibre sensor system comprising a laser source configured to generate interrogation light and a sensor array with at least a first reflector and a second reflector and with a sensor delay being a difference in propagation time for light being reflected from the first reflector and the second reflector, respectively, the method comprising:
   continuously and repeatedly frequency sweeping the interrogation light from the laser source, within a sweep bandwidth (SBW) over a sweep duration ($t_{sw}$) with a substantially constant sweep rate $r=SBW/t_{sw}$, to produce a swept interrogation light signal;
   launching the swept interrogation light signal into the sensor array;
   detecting reflected signals being returned from the sensor array by each of the first reflector and the second reflector, respectively, wherein the detecting comprises mixing a return light signal from the sensor array with a local oscillator signal onto an optical receiver to produce an electrical radio frequency signal;
   demultiplexing the electrical radio frequency signal into a first signal channel and a second signal channel, corresponding to the first reflector and the second reflector, respectively;
   continuously demodulating each of the first signal channel and the second signal channel into a first phase response from the first reflector and a second phase response from the second reflector; and
   subtracting the first phase response from the second phase response to obtain a sensor phase signal.

2. The method according to claim 1, wherein the sensor array comprises one or more additional reflectors between the first reflector and the second reflector so as to comprise a multitude of reflectors.

3. The method according to claim 1, wherein at least one of the first reflector or the second reflector is a discrete reflector.

4. The method according to claim 1, wherein at least one of the first reflector or the second reflector is based on Rayleigh backscatter from a length of fibre.

5. The method according to claim 1, wherein the sweep bandwidth is selected to be less than a bandwidth of the optical receiver.

6. The method according to claim 1, wherein the sweep duration is selected to be larger than $Nt_s$, where $Nt_s$ is a return time from the first reflector to a last reflector, wherein N is the number of reflectors in the sensor array, wherein $t_s$ is an average round-trip time separation between two neighboring reflectors.

7. The method according to claim 1, wherein demultiplexing the electrical radio frequency signal further comprises:
   filtering the electrical radio frequency signal to separate a positive frequency band and a negative frequency band;
   frequency shifting at least one of the positive frequency band or the negative frequency band via mixing with a complex mixer signal having a constant frequency calculated to make the positive frequency band and the negative frequency band overlap in frequency, to provide frequency shifted frequency bands; and
   summing the frequency shifted frequency bands into a combined signal for demodulation.

8. The method according to claim 7, wherein the filtering uses a filter having a time dependent response configured to suppress noise in time intervals without signals in the positive frequency band or the negative frequency band, respectively.

9. The method according to claim 7, wherein the filtering uses a filter having a time and frequency dependent response configured to apply a time and frequency dependent phase shift to at least one of the positive frequency band or the negative frequency band before they are combined by summation.

10. The method according to claim 7, wherein an optical field amplitude of the swept interrogation light signal is apodized at an end of a completing sweep related to one frequency band, and at a beginning of a subsequent sweep related to the other frequency band, for an apodization duration time ($T_{apod}$) from a beginning of the apodization to an end of the apodization, so as to reduce cross-talk between the frequency bands when combined.

11. The method according to claim 10, wherein the end of the apodization of the completing sweep and the beginning of the apodization of the subsequent sweep overlap in time.

12. An interferometric optical fibre sensor system configured for substantially continuous data acquisition, comprising:
   a laser source configured to emit interrogation light at a frequency v;
   an optical modulator configured to continuously and repeatedly frequency sweep the interrogation light to have a frequency $v_1=v+f_1$, within a sweep bandwidth (SBW) over a sweep duration ($t_{sw}$) with a substantially constant sweep rate $r=SBW/t_{sw}$;
   a sensor array having an input end, a distal end, and comprising at least a first reflector and a second reflector, wherein the sensor array is arranged to receive light output from the optical modulator via the input end, wherein the sensor array is further arranged to out-couple a return signal at the input end;
   a coherent receiver arranged to mix a local oscillator signal, with the return signal from the sensor array, to produce an electrical radio frequency signal; and
   a processor configured to demultiplex the electrical radio frequency signal into a first signal channel and a second signal channel, corresponding to the first reflector and the second reflector, respectively, for continuously demodulating each of the first signal channel and the second signal channel into a first phase response from the first reflector and a second phase response from the second reflector, and for subtracting the first phase response from the second phase response to obtain a sensor phase signal.

13. The interferometric optical fibre sensor system according to claim 12, further comprising:

a second optical modulator configured to linearly frequency sweep the light emitted from the laser source to have a frequency $v_2=v+f_2$, wherein the second optical modulator is connected in parallel with the first optical modulator;

an optical spatial switch configured to selectively launch light from the first optical modulator or from the second optical modulator into a sensor fibre; and a reference optical coupler configured to couple output light from the first optical modulator together with light from the second optical modulator to result in a modulated reference signal to be coupled to the coherent receiver.

14. The interferometric optical fibre sensor system according to claim 12, wherein the laser source is a single-frequency continuous-wave (CW) laser.

15. The interferometric optical fibre sensor system according to claim 14, wherein the laser source comprises a fibre distributed feedback (DFB) laser.

16. The interferometric optical fibre sensor system according to claim 12, wherein the laser source is a wavelength division multiplexing (WDM) source or multiple lasers arranged to emit at different WDM channels.

17. The interferometric optical fibre sensor system according to claim 12, wherein the sensor array comprises a first wavelength division multiplexing (WDM) reflector group comprising one or more first reflectors configured to reflect light within a first wavelength range and being substantially non-reflecting for light within a second wavelength range, the sensor array further comprising a second WDM reflector group comprising one or more second reflectors configured to reflect light within the second wavelength band and being substantially non-reflecting for light within the first wavelength range.

18. The interferometric optical fibre sensor system according to claim 12, wherein the optical modulator is an acousto-optic modulator (AOM).

19. The interferometric optical fibre sensor system according to claim 12, wherein the optical modulator is or comprises a Lithium Niobate modulator.

20. An interferometric optical fibre sensor system configured for substantially continuous data acquisition, comprising:

a directly modulatable laser source configured to continuously and repeatedly frequency sweep the interrogation light to have a frequency $v_1$, within a sweep bandwidth (SBW) over a sweep duration ($t_{sw}$) with a substantially constant sweep rate $r=SBW/t_{sw}$;

a sensor array having an input end, a distal end, and comprising at least a first reflector and a second reflector, wherein the sensor array is arranged to receive light output from an optical modulator via the input end, wherein the sensor array is further arranged to out-couple a return signal at the input end;

a coherent receiver arranged to mix a local oscillator signal, with the return signal from the sensor array, to produce an electrical radio frequency signal; and a processor configured to demultiplex the electrical radio frequency signal into a first signal channel and a second signal channel, corresponding to the first reflector and the second reflector, respectively, for continuously demodulating each of the first signal channel and the second signal channel into a first phase response from the first reflector and a second phase response from the second reflector, and for subtracting the first phase response from the second phase response to obtain a sensor phase signal.

* * * * *